July 6, 1965  A. B. HILDEBRANDT  3,192,768
LINE TENSIOMETER
Filed Dec. 5, 1961  3 Sheets-Sheet 1

ALEXANDER B. HILDEBRANDT *INVENTOR.*

BY *Gary C. Honeycutt*
AGENT

July 6, 1965 A. B. HILDEBRANDT 3,192,768
LINE TENSIOMETER
Filed Dec. 5, 1961 3 Sheets-Sheet 2

ALEXANDER B. HILDEBRANDT INVENTOR.

BY *Gary C. Honeycutt*
AGENT

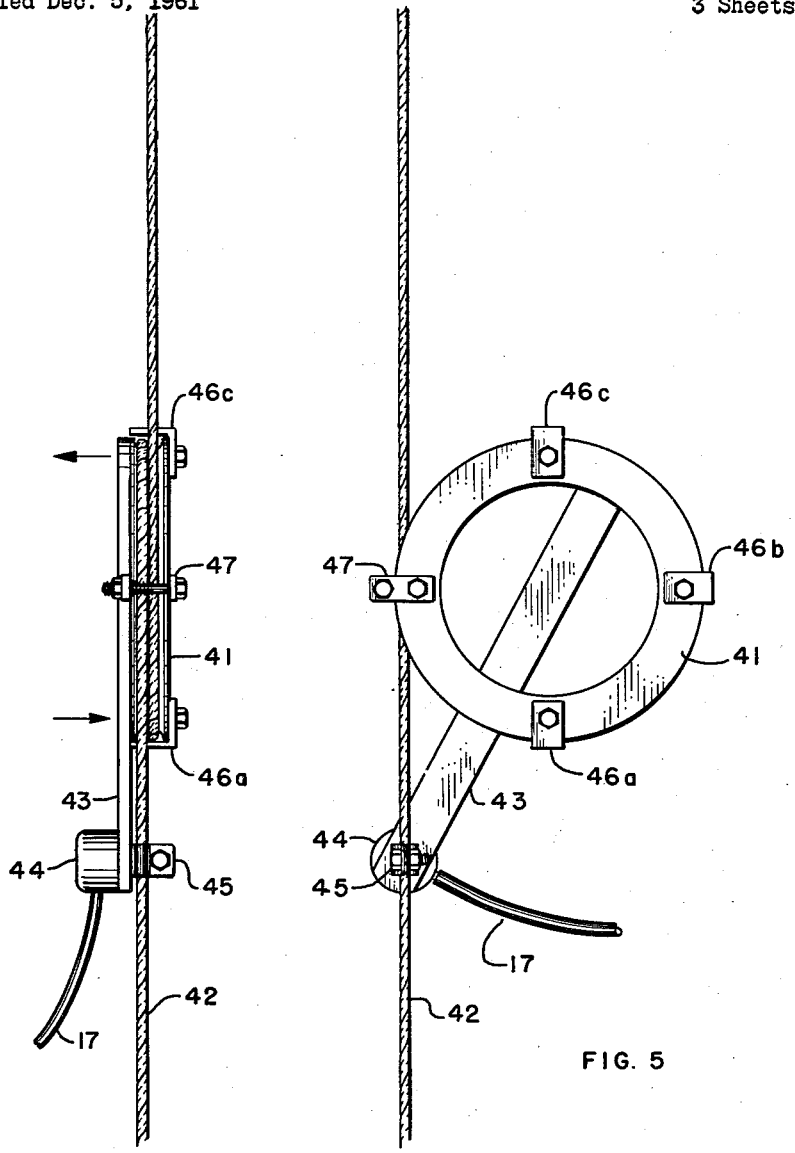

United States Patent Office 3,192,768
Patented July 6, 1965

3,192,768
LINE TENSIOMETER
Alexander B. Hildebrandt, Tulsa, Okla., assignor, by mesne assignments, to Esso Production Research Company, Houston, Tex., a corporation of Delaware
Filed Dec. 5, 1961, Ser. No. 157,104
8 Claims. (Cl. 73—143)

This invention is concerned with apparatus for use in the drilling of well bores. A device is provided for securing an accurate linear force which is proportional to the tension in the deadline of a drilling rig and transforming it into a hydraulic pressure or other useful signal.

In rotary drilling equipment the drill bit is mounted at the lower end of a column of drill pipe which is rotated by means of a square section of pipe or "kelly" secured at the upper end of the column and fitted through a square opening in the rotary table. The table is driven by any suitable source of mechanical power such as a steam or diesel engine. When adding new sections of pipe and when changing the drill bit the drill stem is raised and lowered by means of cable tackle driven by a suitable draw-works. The weight of a portion of this drill stem is imposed on the drill bit at the bottom of the borehole. At greater depths the weight of the drill stem is so great that it would cause excessive buckling of the stem if a portion of such weight were not borne by the draw-works. In order to properly control the draw-works and thereby achieve the desired weight on the drill bit it is necessary to have an accurate means of measuring the tension on the deadline of the draw-works.

In its broadest aspect the invention provides apparatus comprising a sheave positioned to receive at least one substantial turn of the deadline of a drilling rig whereby a force couple is generated which tends to rotate or tilt the sheave about an imaginary axis in the plane of the sheave. A hydraulic cell or other load-responsive means is mounted in a position to sense the rotative force imparted to the sheave by the force couple and convert it to a signal which is proportional to the tension in the cable.

In its preferred embodiment the apparatus of the invention comprises a sheave mounted at its center on a special bearing assembly which provides freedom of rotation about two distinct axes. First, a simple rotatory motion is desired from time to time when supplying fresh cable to the draw-works; and second, a tilting motion imparted by tension in the cable is provided. A hydraulic cell is mounted near the perimeter of the sheave in a position to receive the force of the tilting motion. This force is proportional to the tension applied to the cable.

Among the advantages of the apparatus are its ease of portability and its relatively light-weight construction. It is easily installed and requires very little attention from the operator of the drilling rig. It is highly accurate and inexpensive. The force provided by the tilting motion of the sheave is a very small fraction of the weight applied to the deadline, while at the same time this force is reliably accurate and varies very nearly linearly with changes in tension. Moreover, this apparatus is relatively unaffected by changes in the ambient temperature.

FIGURE 5 is a front elevational view of a simplified embodiment especially adapted for use with smaller drilling rigs.

FIGURE 6 is a view in side elevation of the embodiment shown in FIGURE 5 and shows the relationship of the cable to the sheave, lever arm and hydraulic cell.

Figure 1:
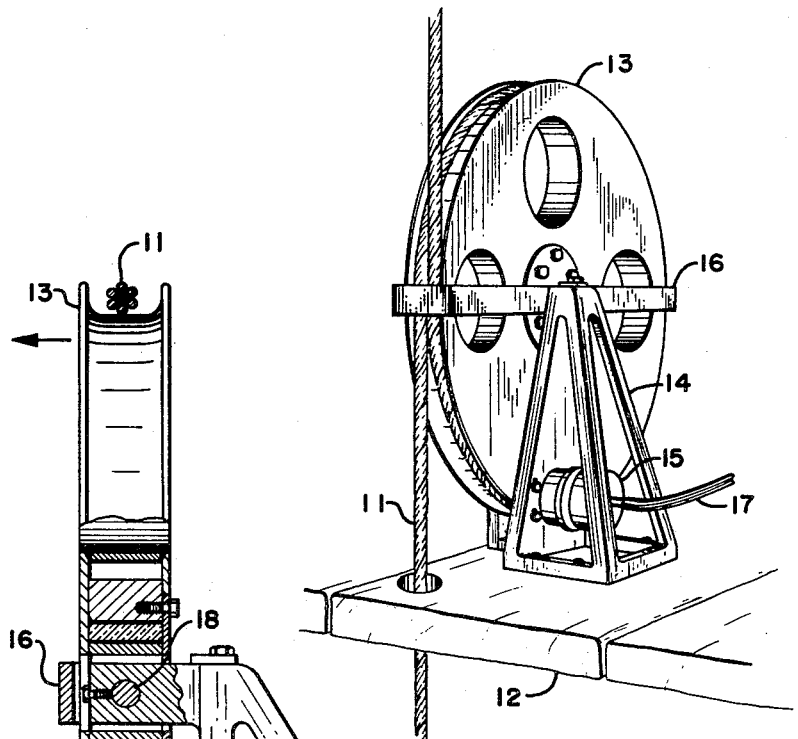
FIGURE 1 is an isometric view of the preferred embodiment of the invention showing the relationship between the weight sensing mechanism of the present invention and the cable or deadline to which it is attached.

Referring now to FIGURE 1 in detail, cable 11 is the deadline of the drilling rig which is anchored beneath the drilling rig floor 12 in a conventional manner. The cable is wrapped one full turn about sheave 13, which is mounted at the center on support means 14. The support means is in turn secured to the rig floor. Hydraulic cell 15 is mounted in a position to receive the force imparted to sheave 13 by the force couple generated by cable 11. Guard arm 16 prevents the cable from inadvertently slipping off sheave 13.

In the operation of the drilling rig the upper end of cable 11 extends over the crown block and then downwardly to the traveling block. Thus the weight exerted by the drill string on the crown block is directly reflected by longitudinal stress in deadline 11. At the point on sheave 13 where the upper and lower arms of deadline 11 pass beneath guard arm 16 it is readily seen that the cable diameters are inherently spaced a distance equal to one cable diameter. This spacing is adequate, and is preferred because of its simplicity and convenience; however, it is within the scope of the invention to increase the distance between the cable diameters, if desired, and thereby increase the force imparted to cell 15 by a given longitudinal stress in the cable.

The tension in the upper arm of the cable is exactly equal to the tension in the lower arm thereof since any tendency for this tension to be unequally distributed is immediately overcome by the fact that the sheave 13 is free to rotate thus equalizing the tension in the two arms of the cable 11. The force of the upper arm is of course upward and the force of the lower arm acts downwardly thus generating a force couple which tends to tilt sheave 13 and thereby cause the lower edge of the sheave to press against hydraulic cell 15.

Under constant tension the entire system is wholly static. The only motion ordinarily introduced is during changes of tension when the tilt of the sheave changes in response thereto. Also, the sheave is rotated from time to time when a portion of the cable is retired from service and removed from the deadline, after which it is re-anchored on the frame in a conventional manner.

Figure 2:
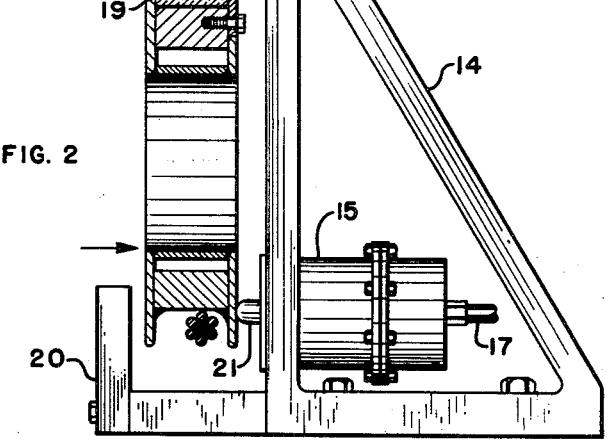
FIGURE 2 is a view in side elevation, partly in section, of the embodiment shown in FIGURE 1 which shows in detail the bearings which support the sheave, and the contact of the hydraulic cell against the perimeter of the sheave.

Referring now to FIGURE 2, and more particularly to the cut-away portion near the center of sheave 13, bearings 18 and 19 are shown. Bearing 18 permits the sheave to tilt as shown by the directional arrows in response to the force couple created by tension in the cable arm. The lower edge of the sheave is thus pressed against element 21 of the hydraulic cell 15, generating a hydraulic pressure in line 17 which is proportional to the hook load on the deadline. The cell 15 need not be located at the edge of the sheave, as shown, but instead may be mounted any convenient distance from the center of the sheave. Bearing 19 permits simple rotation of the sheave in its own plane about an axis normal thereto at its center. Guard member 20 affords an additional safety factor in preventing the cable from slipping off the sheave.

Figure 3:
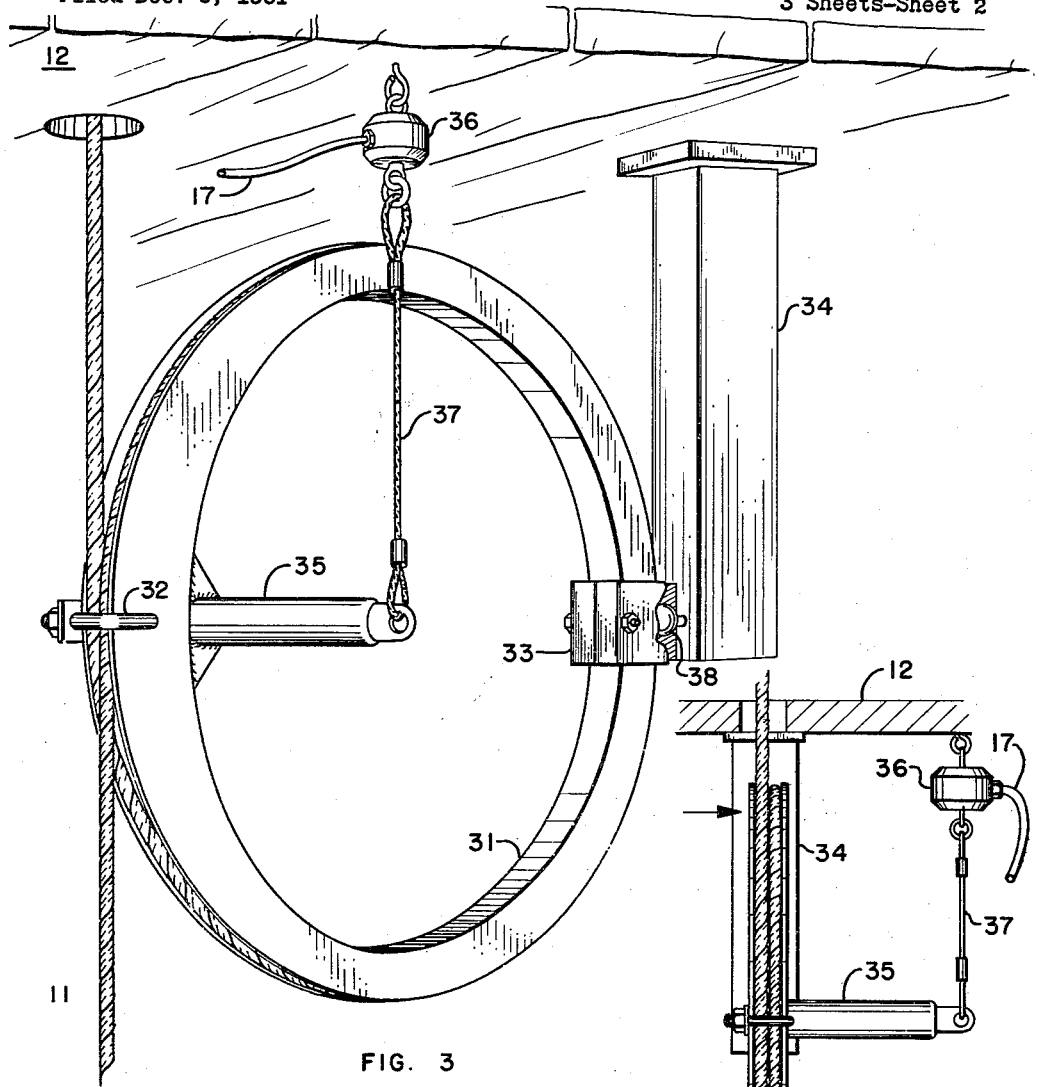
FIGURE 3 is an isometric view of an embodiment of the invention adapted to be mounted beneath the drilling rig floor. The sheave is supported from the side instead of at the center as in the preferred embodiment described above.
Figure 4:
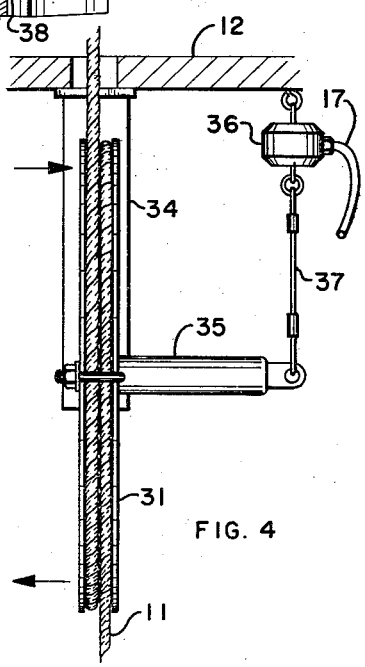
FIGURE 4 is a view in side elevation of the embodiment shown in FIGURE 3 which shows the displaced diameters of the deadline at the point where the cable arms extend tangentially from the sheave, and also shows the lever arm arrangement for placing the hydraulic cell under tension instead of pressure as in the embodiment shown in FIGURE 1.

Referring to FIGURE 3 and FIGURE 4, an embodiment is shown which comprises sheave 31 supported by clamps 32 and 33. The apparatus is secured beneath the rig floor by post 34. Lever arm 35 extends perpendicularly from the sheave, and is connected to cell 36 by a small cable 37. Tension in cable 11 acts to tilt sheave 31 slightly, forcing arm 35 downward, thus applying a load on cell 36 which is proportional to the longitudinal stress in cable 11. Clamp 33 is free to pivot about bearing 38.

Referring now to FIGURE 5, the embodiment shown is an especially light-weight variation of the invention which is suited to smaller drilling rigs, and is attached solely to the cable or deadline 42 without other support means as shown in the heavier embodiments of FIGURES 1 and 3. The essential elements of this embodiment are the sheave 41, the lever arm 43, and the load sensitive cell 44 including clamp 45 attached to the cable. Clamps 46a, 46b, and 46c, as well as clamp 47, are not absolutely essential. However, it is preferred that they be used as a safety factor in keeping the cable in place upon the sheave.

Referring now to FIGURE 6, it is more readily seen how the relationship of the cable to the sheave creates a force couple which tends to tilt the sheave, which in turn forces lever arm 43 and pressure cell 44 against the cable. Clamp 45 is a part of load cell 44 which corresponds to element 21 of FIGURE 2. The clamp extends into the cell 44 a variable distance in response to the pressure applied by lever arm 43.

An especially desirable feature of the present invention is the fact that the pressure generated in line 17 bears a substantially constant proportionality to the tension in the deadline of the rig. In other words, the ratio of the tension of the cable to the pressure generated in line 17 is substantially constant both for high tension loads in the cable and for low tension. This feature of the invention is an improvement over the operation of most prior art means for measuring cable tension, such as the type which simply places a deflection or "kink" in the cable supporting the drill string, by means of a sensing element which is resiliently urged against the line. In these prior art devices, the ratio of the lateral thrust against the sensing element to the longitudinal tension of the cable is a function of the tangent of the angle of deflection. That is, when greater tension is placed on the cable and the kink is partially straightened, the ratio of lateral thrust to longitudinal tension changes.

On the other hand, as the sheave of the present invention is tilted with respect to the path of the cable, the ratio of the force imparted to the hydraulic cell to the tension in the cable changes as a function of the cosine rather than the tangent of the angle of departure from the cable path. Since changes in the deflection angle of the prior art devices occur at an angle which corresponds to rapid changes in the tangent function, this change in the ratio becomes highly significant, whereas with the present apparatus the angle of tilt in the sheave is usually less than two degrees and occurs near zero deflection, at which angle the cosine function is very insensitive to minor angle changes.

The sheave of each embodiment is shown in a position such that a point on its perimeter is aligned with the path of the cable wherein tension is to be measured. While such alignment is inherent in the embodiment of FIGURES 5 and 6, it is not essential in the embodiments of FIGURES 1–4. A substantial misalignment is undesirable, however, since it would require an adjustment in the calibration of the read-out system.

Each of the three embodiments disclosed is shown having one full turn of cable wrapped about the sheave. This is not intended to be a limitation on the invention, however, since it is obviously possible to use multiple turns of the cable about the sheave with the result that the force couple is generated by the first and last strands of cable on the sheave. Moreover, somewhat less than one full turn is sufficient, for example, should circumstances require the sheave to be mounted in a position such that even the nearest point on its perimeter falls a short distance from the normal path of the cable.

The element of each embodiment about which the cable is wrapped is referred to herein as a sheave and is shown in each instance to be circular. In the embodiment of FIGURE 1 such a construction serves a useful function since the sheave 13 is free to rotate about each of perpendicular axes; however, in the embodiments of FIGURES 3 and 5 the circular construction of this element is merely preferable and not essential, since one or more turns of cable about an irregular shape would also create a force couple such as disclosed. In these latter embodiments the only movement of the sheave is the tilting motion which applies pressure against the hydraulic cell. Accordingly, these embodiments need not employ a sheave as such but instead may employ any means adapted to receive at least one substantial turn of the cable, and to provide a rotative force couple as shown.

The sensing devices or load cells in each embodiment are shown to be the conventional piston and cylinder type of hydraulic cell. However, these hydraulic cells may be replaced by any conventional load-sensing device such as an electrical strain gauge or the like.

Pressure line 17 leads to any pressure responsive device such as a bellows or Bourdon tube which may then be connected to a deflection needle or a pen arm to provide either a continuous visual indication or a continuous record of the weight on the cable.

While various embodiments of the invention have been specifically described it is obvious that further modifications will occur to those skilled in the art. Accordingly, it is intended to include all such modifications within the scope of the following claims. For example, although the invention has been described with particular regard to use in the deadline of a drilling rig, it is nevertheless applicable to measure tension in any other cable or line, wherever desired.

What is claimed is:

1. Apparatus for measuring tension in a cable comprising support means, a sheave, and load responsive means, said sheave being pivotally mounted on said support and carrying at least one full turn of said cable about its perimeter such that the cable extends in opposite directions from essentially a single point along the perimeter thereof, whereby tension in said cable generates a force couple tending to rotate said sheave about its pivotal axis, the pivotal axis of said sheave extending in the plane of said sheave perpendicularly from the point on said perimeter which lies substantially in alignment with the cable extensions therefrom, said load responsive means being mounted in a position to sense the rotative force imparted to said sheave by said couple.

2. Cable tension measuring apparatus comprising support means, a sheave mounted thereon in a position to receive at least one substantial turn of said cable, said sheave being adapted to rotate about its center, both with respect to an axis normal to the plane of said sheave and to an axis lying in said plane, and a load sensitive device mounted in a position to measure the rotative force about the axis lying in said plane imparted to said sheave by tension applied to said cable.

3. A cable-tension measuring system comprising a sheave carrying substantially one full turn of taut cable wherein tension is to be measured, said cable extending in opposite directions from essentially a single point along the perimeter of said sheave, thereby generating a force couple tending to tilt said sheave with respect to said cable, and means for sensing the said tilting force, as a measure of tension in the cable, said sheave being pivotally mounted and restrained against pivotal movement by said sensing means.

4. A cable-tension measuring system as defined by claim 3 wherein said sheave is pivotally mounted at a point near the perimeter thereof, wherein said system further comprises a lever arm attached to said sheave, said arm extending from said sheave normal to the plane thereof, and wherein said sensing means is coupled to said lever arm.

5. Apparatus for measuring tension in a cable comprising a sheave; bearing means supporting the sheave and providing it with freedom of rotation about its center, both with respect to a diameter thereof and to an axis normal to the plane of said sheave; and a load-responsive device mounted in a position to restrain rotation of the sheave about its diameter and to indicate the force required to so restrain the sheave.

6. Apparatus for measuring tension in a cable comprising a sheave; means supporting said sheave at its center, said supporting means comprising a bearing assembly which provides said sheave with freedom of rotation about an axis normal thereto at its center and freedom to tilt about a diameter thereof; means for restraining said tilt; and means for measuring the force required to restrain said tilt.

7. In the draw-works of a rotary drilling rig, the improved system for measuring the load carried thereby which comprises a sheave carrying at least substantially one full turn of the deadline of the draw-works, said deadline being anchored independently of said sheave; means supporting said sheave at its center, said supporting means comprising a bearing assembly which provides said sheave with freedom of rotation about an axis normal thereto at its center and freedom to tilt about a diameter thereof; means for restricting said tilt; and means for measuring the force required to restrain said tilt.

8. A cable-tension measuring device mounted solely upon the cable wherein the tension is measured, comprising a sheave carrying substantially one full turn of the cable, whereby a force couple is generated to exert a tilting force upon said sheave, an arm extending from said sheave to a point near said cable, and means mounted on said arm, engaging said cable, for generating a signal proportional to the tilting force imparted to said sheave by said couple.

References Cited by the Examiner
UNITED STATES PATENTS

| | | | |
|---|---|---|---|
| 2,614,420 | 10/52 | Miller | 73—143 |
| 2,656,719 | 10/53 | Webber | 73—143 |
| 2,911,823 | 11/59 | Nistico et al. | 73—95.5 X |
| 2,984,103 | 5/61 | Decker | 73—143 |
| 3,004,558 | 10/61 | Crane | 73—143 X |
| 3,056,287 | 10/62 | Gillett | 73—143 |

FOREIGN PATENTS

| | | |
|---|---|---|
| 1,219,710 | 12/59 | France. |
| 404,558 | 10/24 | Germany. |
| 203,703 | 10/24 | Great Britain. |
| 837,615 | 6/60 | Great Britain. |
| 581,131 | 8/58 | Italy. |

RICHARD C. QUEISSER, *Primary Examiner.*

ROBERT L. EVANS, *Examiner.*